United States Patent
Tsakanikas

(10) Patent No.: US 8,218,317 B2
(45) Date of Patent: Jul. 10, 2012

(54) COMPUTER APPARATUS AND METHOD HAVING DUAL AIR CHAMBERS

(76) Inventor: Panagiotis Tsakanikas, Levittown, NY (US)

( * ) Notice: Subject to any disclaimer, the term of this patent is extended or adjusted under 35 U.S.C. 154(b) by 0 days.

(21) Appl. No.: 13/082,529

(22) Filed: Apr. 8, 2011

(65) Prior Publication Data

US 2011/0182021 A1    Jul. 28, 2011

Related U.S. Application Data

(63) Continuation of application No. 11/931,277, filed on Oct. 31, 2007, now Pat. No. 7,978,469.

(60) Provisional application No. 60/966,322, filed on Aug. 27, 2007.

(51) Int. Cl.
*H05K 7/20* (2006.01)
(52) U.S. Cl. ............... 361/690; 361/679.46; 361/679.51; 361/695; 361/716; 454/184; 62/259.2
(58) Field of Classification Search ............ 361/679.33, 361/679.37, 679.39, 679.4, 679.46, 679.48, 361/688–690, 692, 694–697, 701, 715–717, 361/721–722, 728–730

See application file for complete search history.

(56) References Cited

U.S. PATENT DOCUMENTS

| | | | |
|---|---|---|---|
| 5,559,673 A | 9/1996 | Gagnon et al. | |
| 5,576,931 A | 11/1996 | Crane, Jr. et al. | |
| 5,644,472 A | 7/1997 | Klein | |
| 5,860,291 A | 1/1999 | Johnson et al. | |
| 5,892,654 A | 4/1999 | Worden, Jr. | |
| 5,949,646 A | 9/1999 | Lee et al. | |
| 6,034,870 A | 3/2000 | Osborn et al. | |
| 6,052,281 A | 4/2000 | Hardt et al. | |
| 6,134,107 A | 10/2000 | Kerrigan et al. | |
| 6,141,213 A | 10/2000 | Antonuccio et al. | |
| 6,297,950 B1 | 10/2001 | Erwin | |
| 6,381,138 B1 | 4/2002 | Chen | |

(Continued)

FOREIGN PATENT DOCUMENTS
EP    0 887 725 A1    12/1998

OTHER PUBLICATIONS

PCT International Search Report for PCT/US2008/071347 dated Dec. 3, 2008.

(Continued)

*Primary Examiner* — Courtney Smith
(74) *Attorney, Agent, or Firm* — Carter, DeLuca, Farrell & Schmidt, LLP

(57) ABSTRACT

A computer system is disclosed having an enclosure having a plurality of components. The computer system further includes a first chamber including a first set of cooling devices; and a second chamber including solely a set of components and a second set of cooling devices. The second chamber is located adjacent to the first chamber, and the set of components includes components not included in the first chamber. The set of components includes solely a plurality of storage components selected from the group consisting of a CD-ROM and a hard drive. Air flow is unidirectional from a front side of the enclosure to a rear side of the enclosure. Further, air flow is prevented from flowing between the first chamber and the second chamber by a solid separation mechanism there between. The first chamber has an air flow path independent of the air flow path of the second chamber.

20 Claims, 8 Drawing Sheets

U.S. PATENT DOCUMENTS

| | | |
|---|---|---|
| 6,400,567 B1 | 6/2002 | McKeen et al. |
| D460,965 S | 7/2002 | O'Brien |
| 6,542,362 B2 | 4/2003 | Lajara et al. |
| 6,704,196 B1 | 3/2004 | Rodriguez et al. |
| 6,867,960 B2 | 3/2005 | Chou |
| 6,958,906 B2 | 10/2005 | Wu et al. |
| 7,205,474 B2 | 4/2007 | Ya |
| 7,226,353 B2 | 6/2007 | Bettridge et al. |
| 7,238,104 B1 | 7/2007 | Greenslade et al. |
| 7,245,486 B2 | 7/2007 | Kumano et al. |
| 7,573,713 B2 | 8/2009 | Hoffman et al. |
| 2003/0184961 A1 | 10/2003 | Ahn |
| 2003/0223195 A1 | 12/2003 | Schmid |
| 2004/0008484 A1* | 1/2004 | Konshak et al. ............ 361/687 |
| 2006/0120001 A1 | 6/2006 | Weber et al. |
| 2007/0103858 A1 | 5/2007 | Lan et al. |
| 2007/0133167 A1 | 6/2007 | Wagner et al. |
| 2007/0201205 A1 | 8/2007 | Holmes et al. |
| 2007/0217139 A1 | 9/2007 | Lin |
| 2007/0247804 A1* | 10/2007 | Li et al. ................... 361/687 |

OTHER PUBLICATIONS

PCT International Preliminary Report on Patentability and Written Opinion of the International Searching Authority dated Mar. 2, 2010 for PCT/US2008/071347.

* cited by examiner

COMPUTER APPARATUS AND METHOD HAVING DUAL AIR CHAMBERS

PRIORITY

This patent application is a continuation application of a patent application filed on Oct. 31, 2007 titled "COMPUTER APPARATUS AND METHOD HAVING DUAL CHAMBERS" and assigned U.S. patent application Ser. No. 11/931,277 which claims priority to a provisional patent application filed in the United States Patent and Trademark Office on Aug. 27, 2007 titled "COMPUTER CASE HAVING DUAL AIR CHAMBERS" and assigned U.S. Provisional Patent Application Ser. No. 60/966,322. The entire contents of both documents are incorporated herein by reference.

TECHNICAL FIELD

The present disclosure relates to computer cases and, more specifically, to a computer case having dual air chambers for providing efficient air flow through the computer case.

BACKGROUND

In general, conventional personal computer (PC) cases include the same electronic contents. These electronic contents include components such as one or more hard drives, CD-ROMs, a motherboard, peripheral cards, power supply, etc. All of these electronic components or computer parts reside in the same enclosure and utilize the same air space to cool off. In other words, in this scenario, all the electronic components are enclosed within a single air chamber, in different case formats, styles and sizes.

FIG. 1 illustrates an interior elevational view of components of a conventional computer system 10. The components of the computer system 10 include a side panel 12, a CD-ROM 14, a front fan 16, a hard drive 18, a motherboard 20, a central processing unit (CPU) 22, a rear fan 24, and a power supply 26. In most conventional computer systems, the CD-ROM 14 and the hard drive 18 are located in the front portion of the case, whereas the motherboard 22 and the power supply 26 are located in the rear portion of the case.

The air flow can vary from PC case to PC case because of the size and style of the PC case itself. Air can be forced in by the front fan 16 or the air can be pulled in through the case, via the rear fan 24. Regardless which way the air moves through the case, it is still hot or heated before it gets to the CPU 22 and electronics on the motherboard 20. This is because the hard drive 18 is in front of the motherboard 20, directional-wise from front to rear of the case. Therefore the hard drive 18 exhausts its heat directly on the motherboard 20.

FIG. 2 illustrates the air flow in the elevational view of components of the conventional computer system 10 of FIG. 1. Similar elements of FIG. 1 are omitted with reference to FIG. 2. FIG. 2 illustrates the air flow through the case. Specifically, four air flows are mentioned; an inlet air flow 3, a hard drive air flow 5, a CPU air flow 7, and an outlet air flow 9. The inlet air flow 3 moves through the front fan 16, through the hard drive 18 as hard drive air flow 5, through the CPU 22 as CPU air flow 7, and out the rear fan 24 as outlet air flow 9. Therefore, the cool air passes through and around the interior components of the computer system 10, and as the cool air passes around it becomes hot air by absorbing the heat from the interior components. A CPU fan (not shown) takes the hot air and re-circulates it by trying to cool off the CPU 22 and peripheral motherboard electronic components (not shown). Finally, the rear fan 24 removes the re-circulated hot air from the PC case of the computer system 10.

In general, motherboard manufacturers' have installed various temperature sensors (not shown) on the motherboard 20 and the CPU 22. These sensors aid in alerting the build-in hardware safeguard management about the temperature of the CPU 22 and the ambient air temperature around the motherboard 20. Once the temperature is read and collected from the sensors, then the build-in hardware safeguard management sends various commands to the cooling fans 16, 24, plugged onto the motherboard 20, and managed by the motherboard hardware management in order to act accordingly by spinning faster or slower, depending on the temperature sensor reading.

When the temperature within the casing is cool, or within certain pre-set thresholds, the cooling fans 16, 24 run slow or at a fraction of their maximum speed. When the temperature sensors detect a high temperature, then the cooling fans 16, 24 spin faster depending on the pre-set thresholds, thus trying to cool off the interior components or bring the temperature down to acceptable levels. If the temperature reaches a certain non-operational or non-acceptable pre-set threshold, the CPU 22 steps down its operating clocking speed to protect it from burning up.

Several cooling systems have been proposed by the conventional art. Specifically, the standard inexpensive cooling method to cool off electronic components within the PC case is to use variable speed fans controlled by built-in motherboard management, located in the front of the case as a front fan 16, in the rear of the case as a rear fan 24, and a CPU fan, which is attached to a heatsink directly connected to the CPU 22. In addition, there may also be a power supply fan (not shown), which is enclosed in the power supply 26 with a main purpose of cooling off the power supply 26.

However, since the conventional design is air flow inefficient and heat dissipation inefficient, heat is always building in the PC case with the use of the PC. This causes the motherboard hardware management to send commands to the fans to spin up, thus moving more air and trying to cool off the equipment. To compensate for the inefficiency of the case design, the fans spin faster, and, thus consume more power and create more noise.

Additional cooling options recommended by the conventional art include: (1) side panel opening, where manufacturers (PC or computer case) have created another opening on the side panel and installed a case fan forcing air in directly on the CPU fan. This has some positive effects on the CPU and electronic peripheral parts close to it, (2) a top opening, where manufacturers have installed an additional fan. This fan helps the rear fan(s) by removing additional hot ambient air and helps in the exchange of cooler air within the case, (3) installing liquid cooling for the CPU and the ambient air within the case, (4) creating additional vents on the side panels, and/or (5) creating additional ducts to funnel the airflow where it is most needed.

However none of these methods has eliminated the hot air from the hard drives moving over the motherboard towards the rear of the case. Consequently, it would be highly desirable to provide a computer system that provides for efficient air flow, reduces fan noise, consumes less power, and runs motherboard electronic components cooler.

SUMMARY

A computer system comprising: an enclosure having a plurality of components; a first chamber including a first set of components; and a second chamber including a second set of components, the second chamber located adjacent to the first chamber and the first set of components being different than the second set of components; wherein air flow is prevented from flowing between the first chamber and the second chamber; and wherein the first chamber includes a first set of cooling devices and the second chamber includes a second set of cooling devices.

A method for preventing airflow between a first chamber and a second chamber, the chambers located within an enclosure, the method comprising: separating a plurality of components within the enclosure; positioning a first set of components in the first chamber; positioning a second set of components in the second chamber, the second chamber located adjacent to the first chamber and the first set of components being different than the second set of components; and providing a first set of cooling devices in the first chamber and a second set of cooling devices in the second chamber.

BRIEF DESCRIPTION OF THE DRAWINGS

Further features, aspects and advantages of the apparatus and methods of the embodiments of the present disclosure will become better understood with regard to the following description, appended claims, and accompanying drawings where:

DETAILED DESCRIPTION

There are certain user requirements that a PC case is requited to include. PC users desire to have a CD-ROM and one or more hot swappable hard drives in the front portion of the case for easy accessibility. PC users also expect to have the motherboard connectors and the power supply in the back portion of the case in order to hide all the connectivity cables. Users who are focused on the power capacity of their PC, desire to have all the potential expansion slots available in full size format (height and length) for expandability, they expect a full size power supply, and plenty of storage room.

Figure 1:
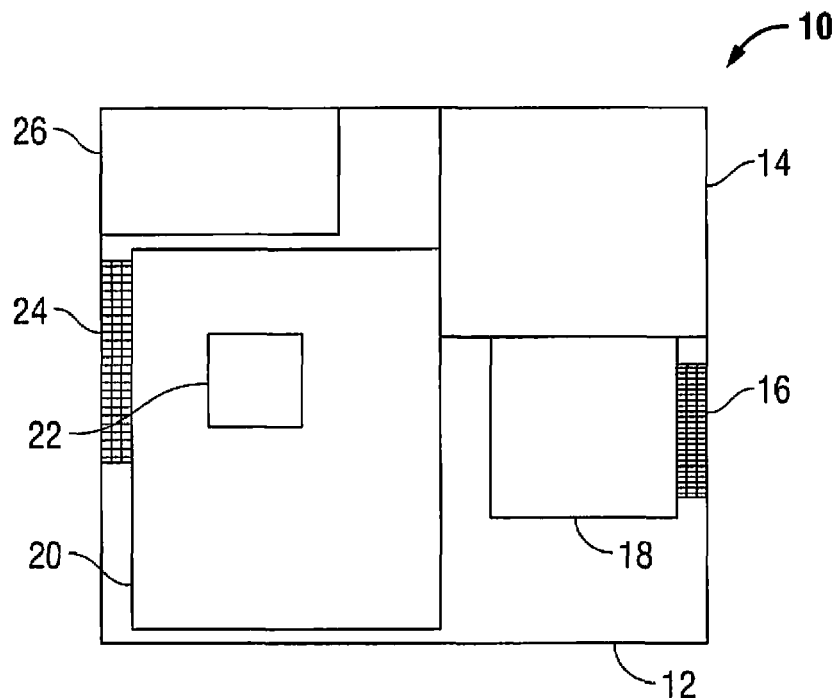
FIG. 1 illustrates an interior elevational view of components of a conventional computer system.
Figure 2:
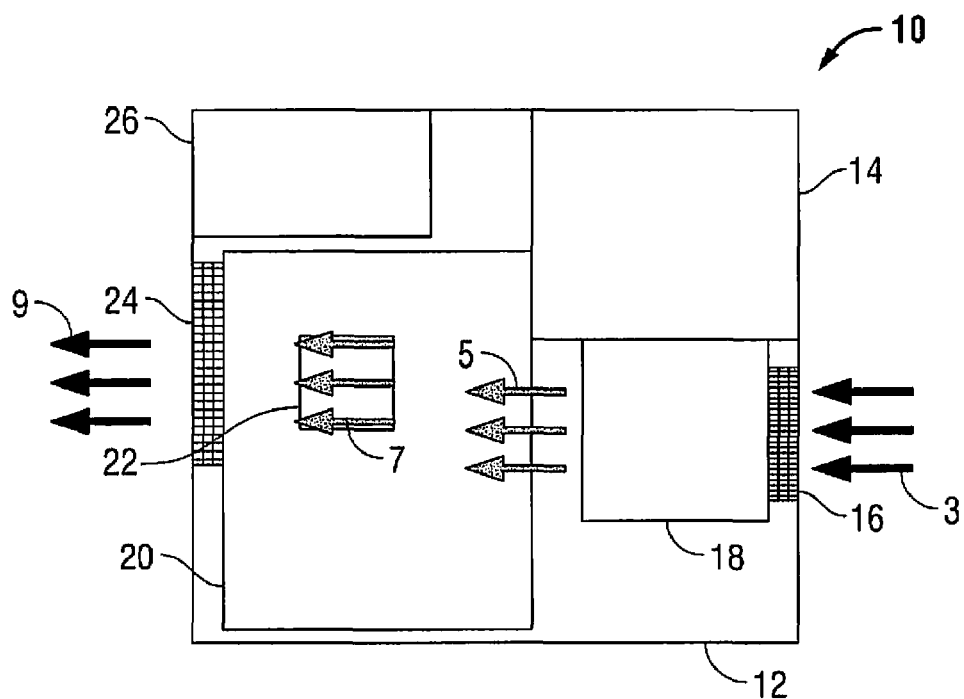
FIG. 2 illustrates an interior elevational view of components of a conventional computer system depicting the air flow within the computer system.
Figure 3:
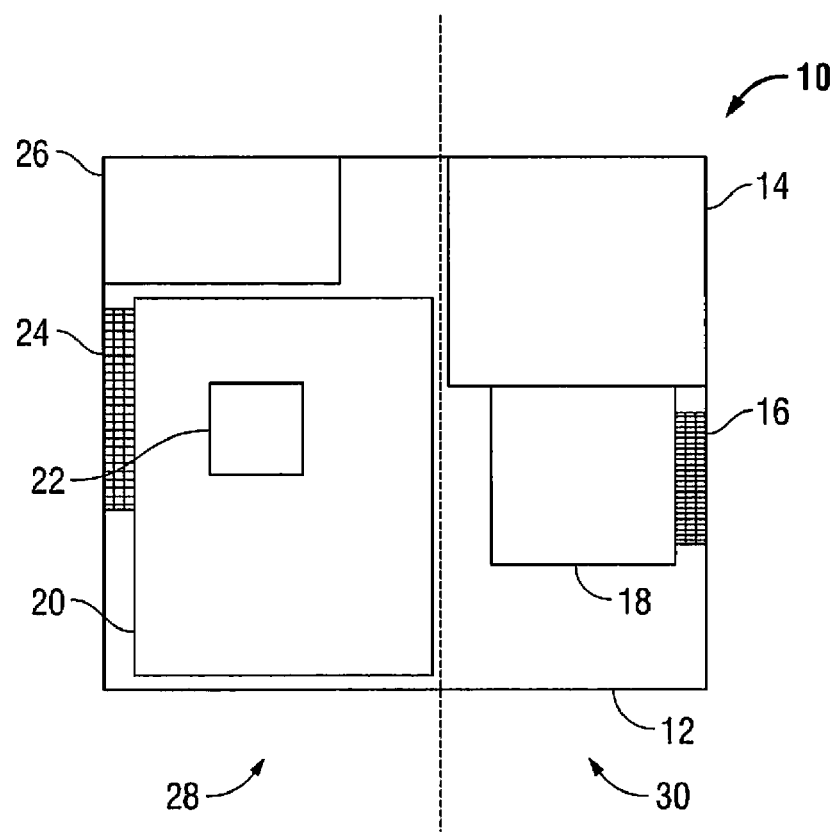
FIG. 3 illustrates the logical separation of electrical components of a computer system.

FIG. 3 illustrates the logical separation of electrical components of a computer system 10. The components of the computer system 10 include a side panel 12, a CD-ROM 14, a front fan 16, a hard drive 18, a motherboard 20, a central processing unit (CPU) 22, a rear fan 24, and a power supply 26. The CD-ROM 14 and the hard drive 18 are located in the front portion of the case, whereas the motherboard 22 and the power supply 26 are located in the rear portion of the case. The computer system 10 may be separated into electronics components 28 and storage components 30. The electronic components 28 include the motherboard 20, the CPU 22, and the power supply 26. The storage components 30 include the CD-ROM 14, and the hard drive 18.

Figure 4:
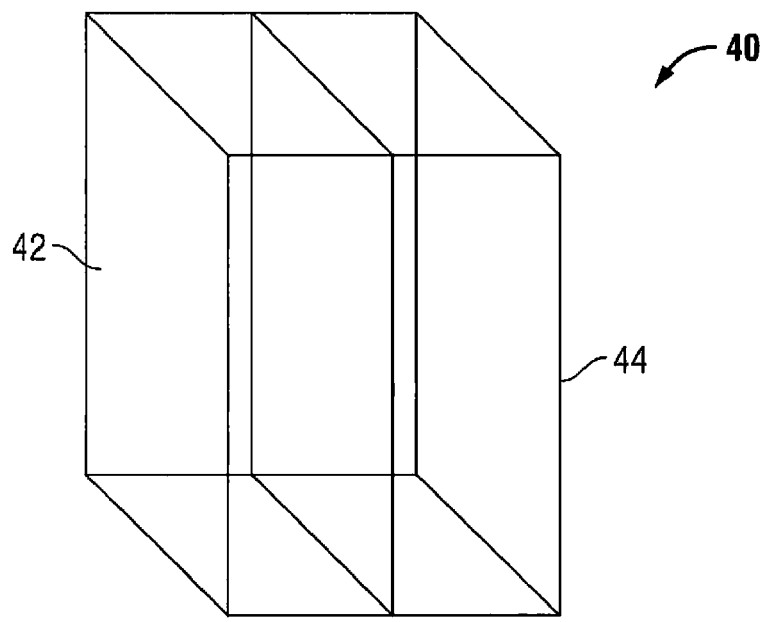
FIG. 4 illustrates a separation mechanism for separating electrical components of a computer system, in accordance with a first embodiment of the present disclosure.

FIG. 4 illustrates a separation mechanism for separating electrical components of a computer system, in accordance with a first embodiment of the present disclosure. The case 40 is separated into a first chamber 42 and into a second chamber 44. The first chamber 42 may be the chamber including the electronics components 28, whereas the second chamber 44 may be the chamber including the storage components 30. Thus, each category or group of PC components resides in its own air space or air chamber. In the first embodiment, the motherboard 20 and the power supply 26 reside in one chamber and the CD-ROM 14 and hard disk drives 18 reside in another chamber. Preferably, the two air chambers are positioned next to each other, within the same PC housing or PC case 40.

Figure 5:
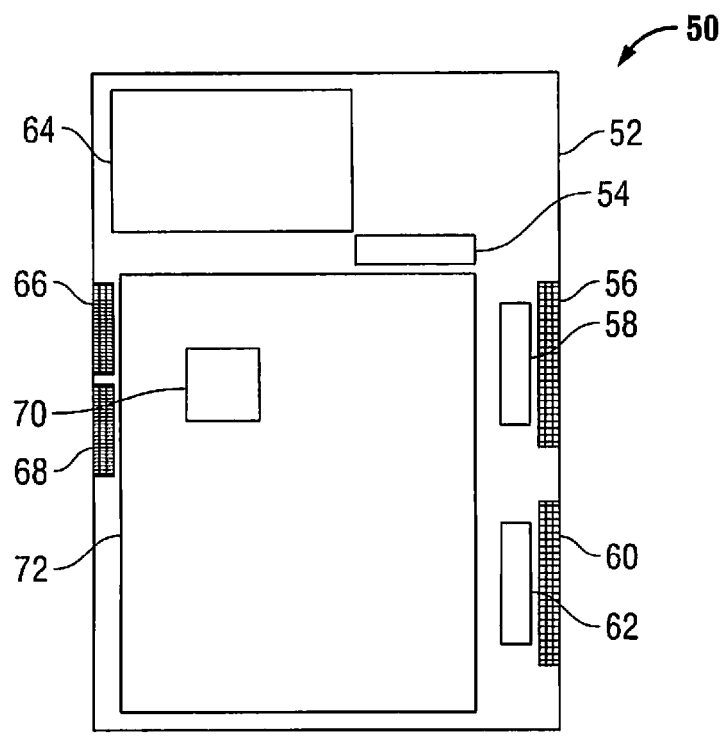
FIG. 5 illustrates a first chamber of the separation mechanism of FIG. 4, in accordance with the first embodiment of the present disclosure.

FIG. 5 illustrates a first chamber of the separation mechanism of FIG. 4, in accordance with the first embodiment of the present disclosure. The interior elevational view of the first chamber 50 includes a first chamber side panel 52, a side cable portal 54, an upper front fan 56, an upper cable portal 58, a lower front fan 60, a lower cable portal 62, a power supply 64, a first rear fan 66, a second rear fan 68, a CPU 70, and a motherboard 72. Cable portal 54 is located between the two air chambers 42, 44, in a center divider (not shown), for connectivity cables 58, 62 to pass through in order to connect the electronic components together. The cable portal 54 self-closes around the cables 58, 62 that pass through, thus minimizing any leakage of air between the two air chambers 42, 44.

Figure 6:
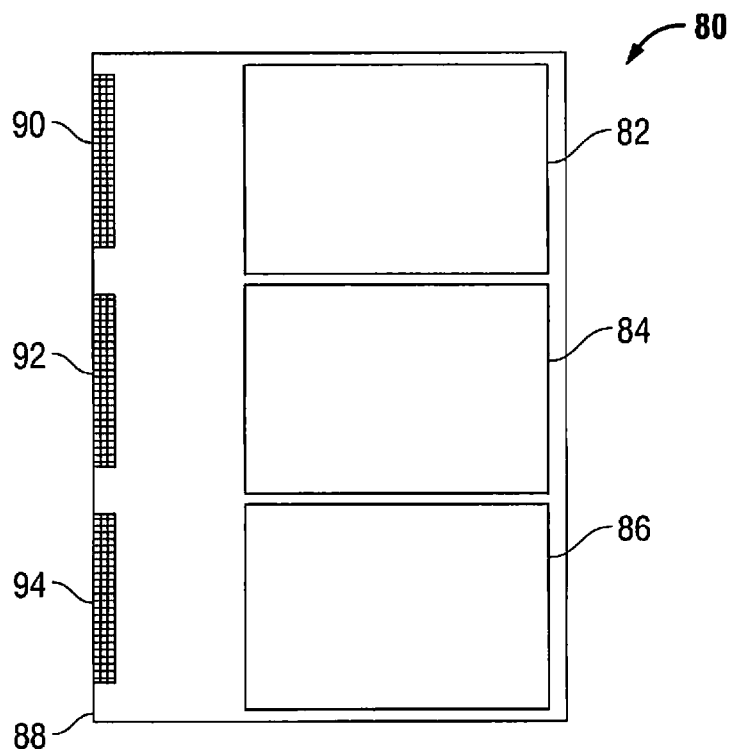
FIG. 6 illustrates a second chamber of the separation mechanism of FIG. 4, in accordance with the first embodiment of the present disclosure.

FIG. 6 illustrates a second chamber of the separation mechanism of FIG. 4, in accordance with the first embodiment of the present disclosure. The interior elevational view of the second chamber 80 includes a first input/output device 82, a second input/output device 84, a third input/output device 86, a second chamber side panel 88, a first rear fan 90, a second rear fan 92, and a third rear fan 94.

Figure 7:
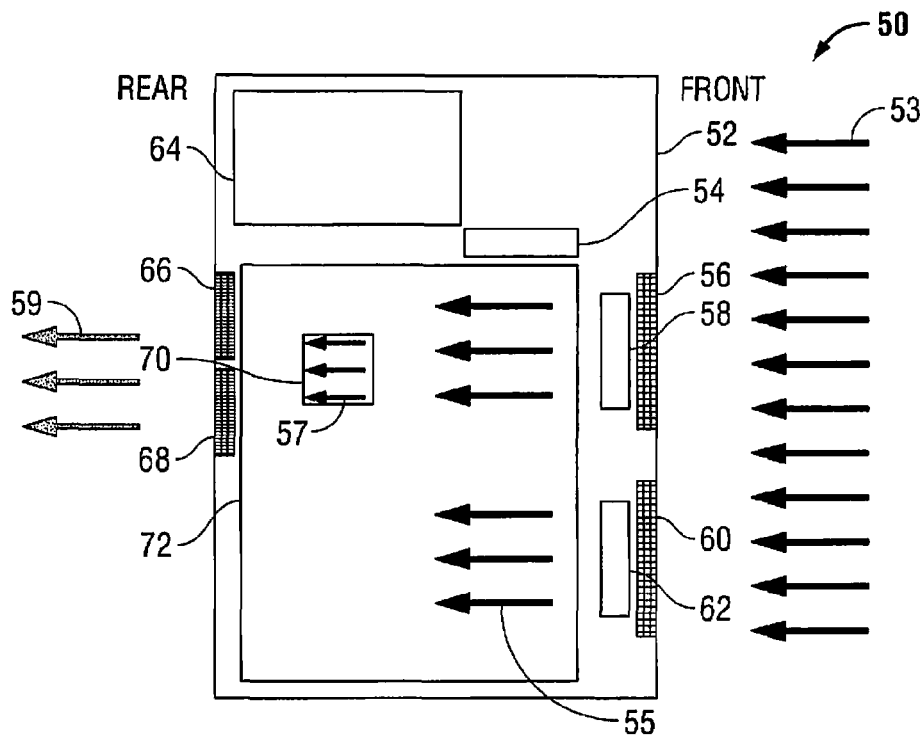
FIG. 7 illustrates the air flow of the first chamber of the separation mechanism of FIG. 4, in accordance with the first embodiment of the present disclosure.

FIG. 7 illustrates the air flow of the first chamber of the separation mechanism of FIG. 4, in accordance with the first embodiment of the present disclosure. Similar elements of FIG. 5 are omitted with reference to FIG. 7. FIG. 7 illustrates the air flow through the case 40 in chamber 42. Specifically, 4 air flows are mentioned; an inlet air flow 53, a motherboard air flow 55, a CPU air flow 77, and an outlet air flow 59. The inlet air flow 53 moves through the upper front fan 56 and lower front fan 58, through the motherboard 72 as motherboard air flow 55, through the CPU 70 as CPU air flow 57 and out the first rear fan 66 and the second rear fan 68 as outlet air flow 59. Therefore, the cool air passes through and around the interior components of the first chamber 50.

Figure 8:
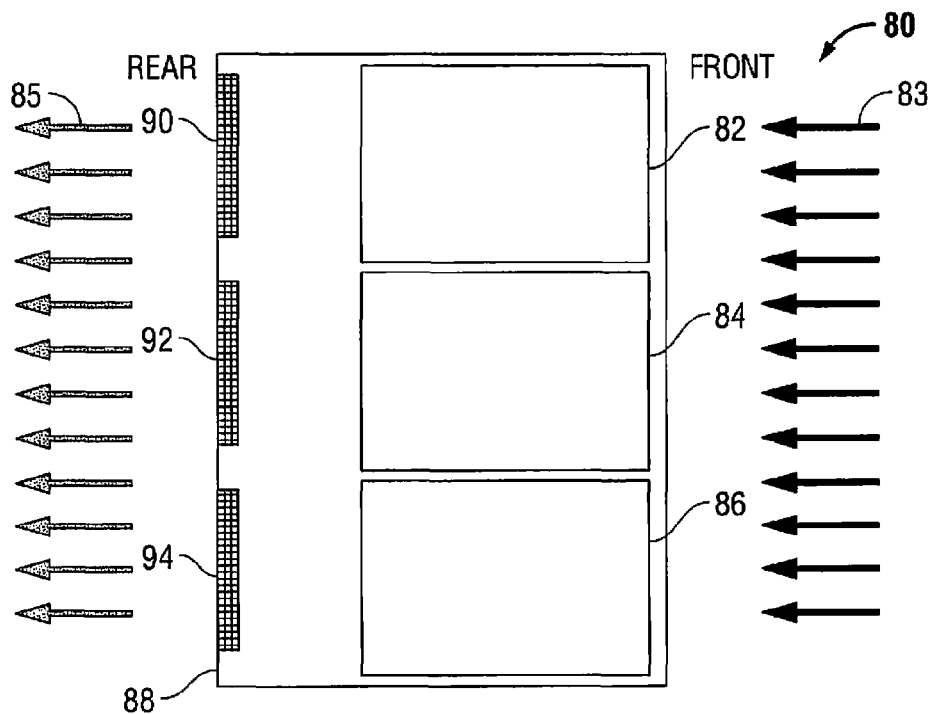
FIG. 8 illustrates the air flow of the second chamber of the separation mechanism of FIG. 4, in accordance with the first embodiment of the present disclosure.

FIG. 8 illustrates the air flow of the second chamber of the separation mechanism of FIG. 4, in accordance with the first embodiment of the present disclosure. Similar elements of FIG. 6 are omitted with reference to FIG. 8. FIG. 8 illustrates the air flow through the case 40 in chamber 44. Specifically, 2 air flows are mentioned; an inlet air flow 83 and an outlet air flow 85. The inlet air flow 83 moves through the first input/output device 82, the second input/output device 84, and the third input/output device 86 toward the first rear fan 90, the second rear fan 92, and the third rear fan 94 as an output air flow 85.

As a result, the design of FIGS. 7 and 8 is shorter depth-wise and the air is exchanged very quickly and efficiently, within the PC case 40. This is equally correct for both the electronics air chamber 42 and the storage air chamber 44. Since there are no hard disk drives 18 before the motherboard 20, there is no additional heat flowing over the motherboard 20. The air coming into contact with the motherboard 20 is cool air (e.g., room temperature). Therefore, the all electronic components within the case 40 stay cool and the fans run slower since they don't have to move as much air to cool off the all the internal electronic equipment.

Because of the fact that there is no hot or pre-heated air flowing over the motherboard 20, and the motherboard components stay cool, there is no need for the CPU fan to blow towards the motherboard 20. In addition, it is recommended that the CPU fan blow toward the rear of the case 40. The rear fans 66, 68 assist the CPU fan in quickly removing the heat from the heatsink. The front fans 56, 60 supply the motherboard components with enough cool air to keep them at cool operating temperatures.

Figure 9:
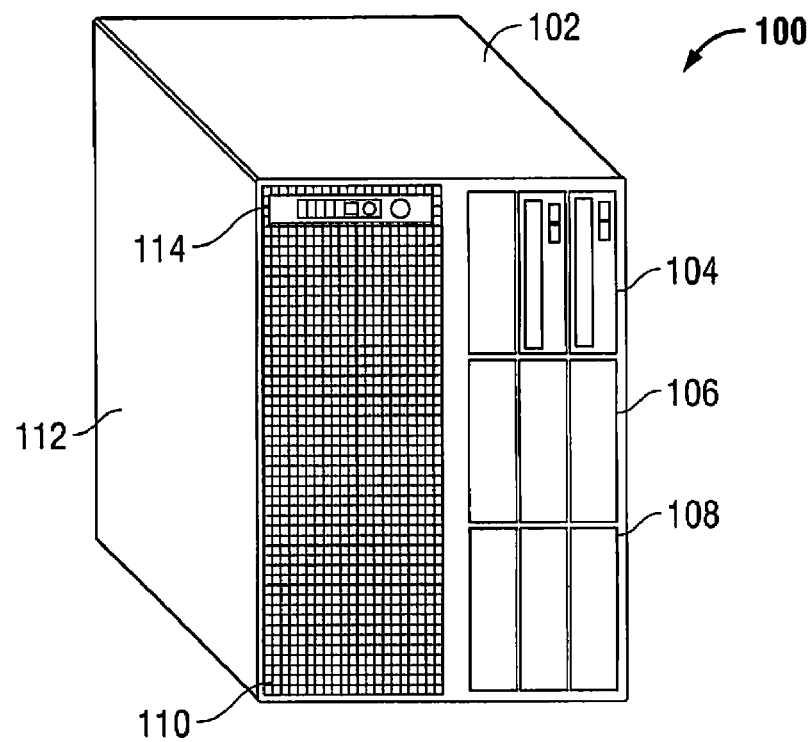
FIG. 9 illustrates a front side view of a PC case having dual chambers and a partial ventilated case grill, in accordance with a second embodiment of the present disclosure.

FIG. 9 illustrates a front side view of a PC case having dual chambers and a partial ventilated case grill, in accordance with a second embodiment of the present disclosure. The dual air chambers system with partial ventilated case grill 100 includes a top panel 102, input/output devices 104, a first set of expansion slots 106, a second set of expansion slots 108, a ventilated case grill 110, a removable side panel 112, and a power panel 114. At least a portion of one side of the enclosure is a ventilated grill 110. The ventilated case grill 110 may be positioned only on the first chamber side of the case 40. The ventilated case grill 110 may be positioned only on the second chamber side of the case 40. FIG. 9 depicts the ventilated case grill 110 positioned on the front side of the first chamber 42 only.

Figure 10:
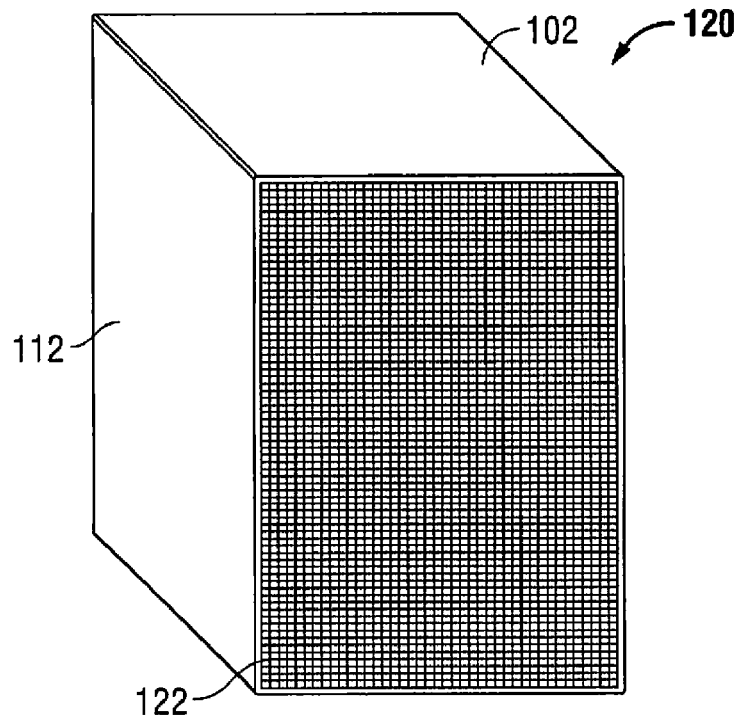
FIG. 10 illustrates a front side view of a PC case having dual chambers and a fully closed ventilated case door, in accordance with the second embodiment of the present disclosure.

FIG. 10 illustrates a front side view of a PC case having dual chambers and a fully closed ventilated case door, in accordance with the second embodiment of the present disclosure. The dual air chambers system with full ventilated case door 120 includes a top panel 102, a removable side panel 112, and a ventilated case door 122. Therefore, the ventilated case door 122 may be positioned on any side of the case 40. The ventilated case door 122 may allow air to flow to both the first chamber 42 and the second chamber 44 or only to one of those chambers, by positioning the ventilated case door 122 on a side, other than the front side or rear side of the case 40.

Figure 11:
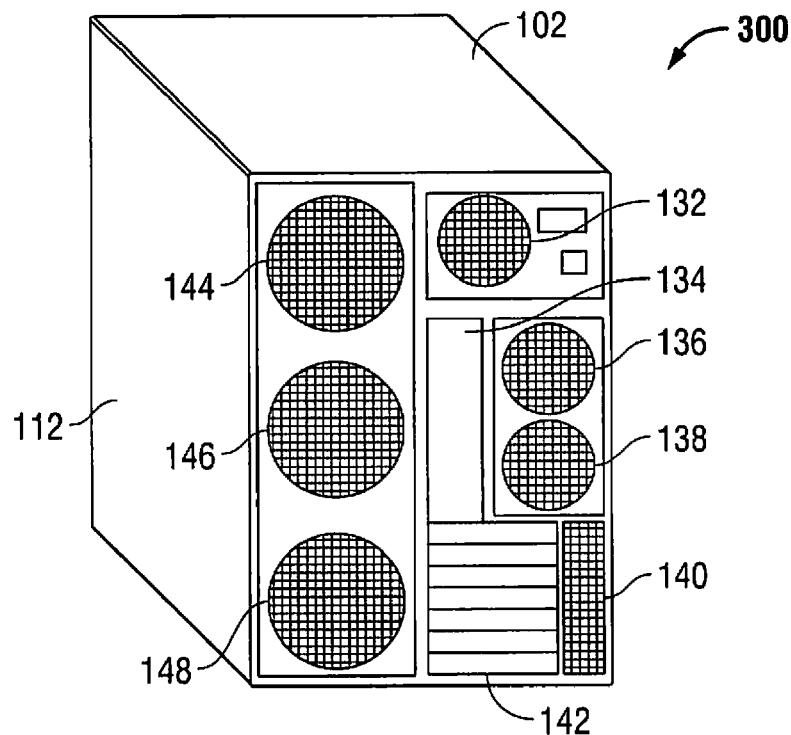
FIG. 11 illustrates a rear side view of a PC case having dual chambers and either a partial ventilated case grill or a fully closed ventilated case door, in accordance with the second embodiment of the present disclosure.

FIG. 11 illustrates a rear side view of a PC case having dual chambers and either a partial ventilated case grill or a fully closed ventilated case door, in accordance with the second embodiment of the present disclosure. The rear view of the dual chambers 130 includes a power supply 132, motherboard inputs 134, a first electronics rear fan 136, a second electronics rear fan 138, a ventilation grill 140, expansion slots 142, a first storage rear fan 144, a second storage rear fan 146, and a third storage rear fan 148. In addition, rear view dual chambers 130 include a top panel 102 and a removable side panel 112. Thus, the first chamber 42 may include a first partial ventilated grill located on a first chamber side and the second chamber 44 may include a second partial ventilated grill located on a second chamber side. In addition, the first partial ventilated grill located on the first chamber side may be a different size than the second partial ventilated grill located on the second chamber side, as illustrated below with reference to FIG. 12.

Figure 12:
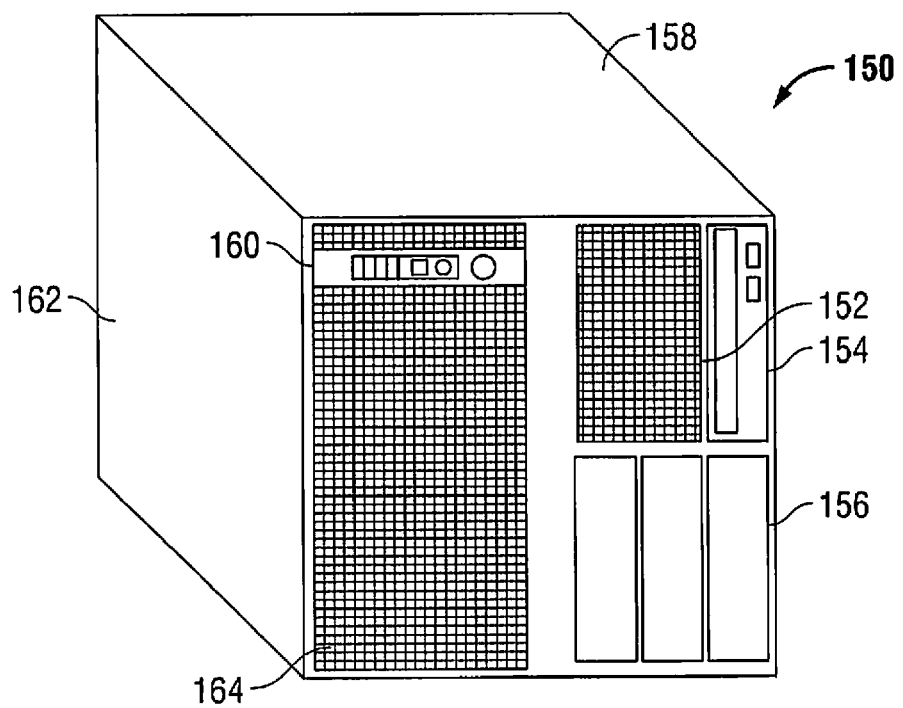
FIG. 12 illustrates a front side view of a PC case having dual chambers and dual grills, in accordance with a third embodiment of the present disclosure.

FIG. 12 illustrates a front side view of a PC case having dual chambers and dual grills, in accordance with a third embodiment of the present disclosure. The dual air chambers system with dual grills 150 includes a first ventilated case grill 152, an input/output device 154, expansion slots 156, a top panel 158, a power panel 160, a removable side panel 162, an a second ventilated case grill 164. In addition, the at least one side of the case 40 may include a plurality of ventilated grills having one or more different shapes and sizes, the plurality of ventilated grills located on both a first chamber side and a second chamber side.

Figure 13:
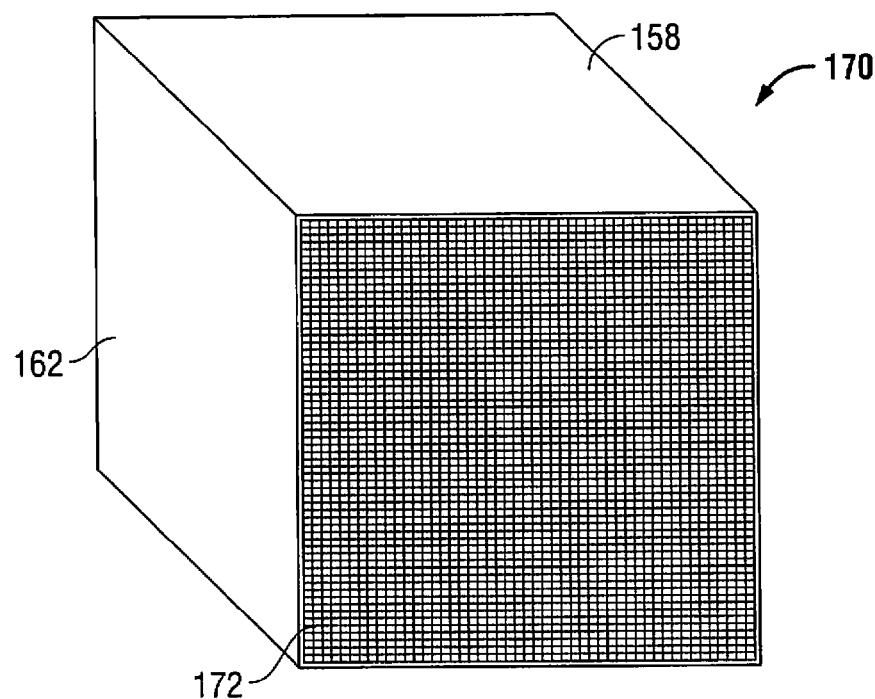
FIG. 13 illustrates a front side view of a PC case having dual chambers and one single ventilated case door, in accordance with the third embodiment of the present disclosure.

FIG. 13 illustrates a front side view of a PC case having dual chambers and one single ventilated case door, in accordance with the third embodiment of the present disclosure. The dual air chambers with a ventilated case door 170 include a top panel 158, a removable side panel 162, and a ventilated case door 172. In FIG. 13, the front portion of the case 40 is replaced with a ventilated case door 170. However, it is envisioned that any side of the case 40 may be replaced with a ventilated case door 170.

Figure 14:
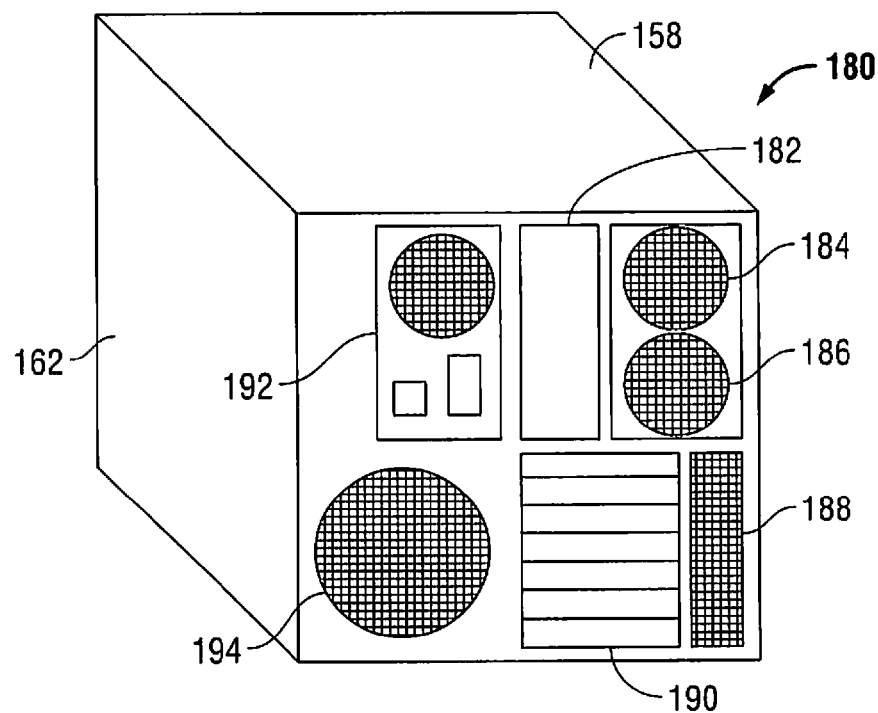
FIG. 14 illustrates a rear side view of a PC case having dual chambers and either dual grills or one single ventilated case door, in accordance with the third embodiment of the present disclosure.

FIG. 14 illustrates a rear side view of a PC case having dual chambers and either dual grills or one single ventilated case door, in accordance with the third embodiment of the present disclosure. The rear view of the dual chambers 180 includes motherboard outputs 182, a first electronics rear fan 184, a second electronics rear fan 186, a ventilation grill 188, expansion slots 190, a power supply 192, and a storage rear fan 194. In addition, the rear view of the dual chambers 180 includes a top panel 158 and a removable side panel 162. FIG. 14 illustrates that at least one side of the case 40 may include a plurality of ventilated grills having one or more different shapes and sizes, the plurality of ventilated grills located on both a first chamber side and a second chamber side.

Figure 15:
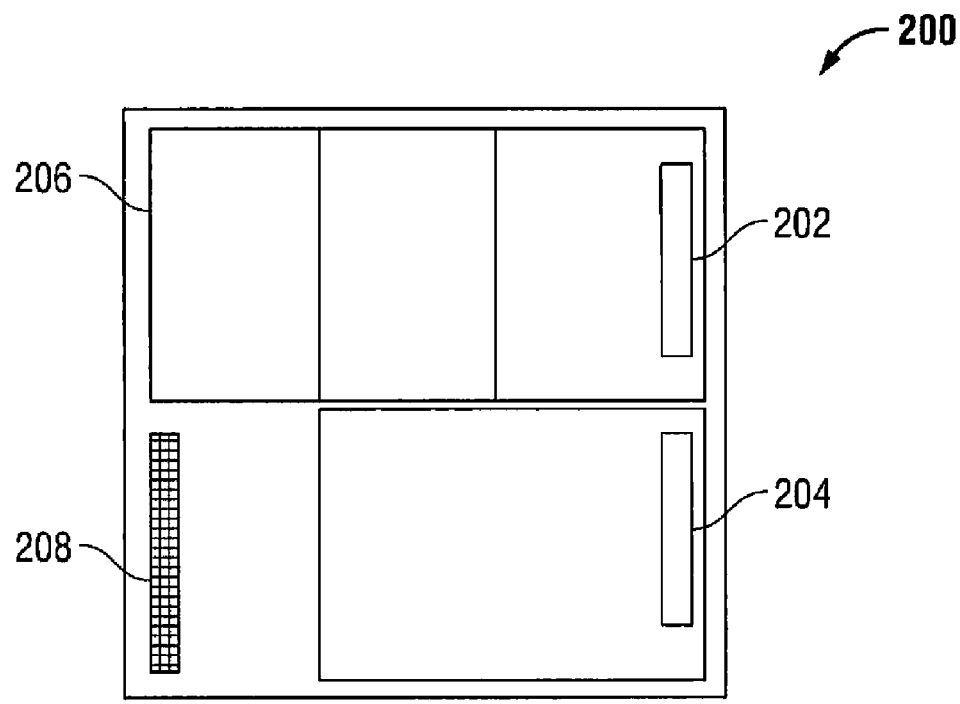
FIG. 15 illustrates an interior elevational view of components of a computer system in a first chamber where the power supply is separated from the motherboard, in accordance with a fourth embodiment of the present disclosure.

FIG. 15 illustrates an interior elevational view of components of a computer system in a first chamber where the power supply is separated from the motherboard, in accordance with a fourth embodiment of the present disclosure. The interior elevation view of the first chamber 200 includes a first input/output device 202, a second input/output device 204, a power supply 206, and a rear fan 208. In FIG. 15, the power supply is positioned in a separate chamber than the motherboard/CPU. In other words, each electronic component may be positioned in a separate chamber, each separate chamber having its own cooling mechanism designed specifically for that electronic component.

Figure 16:
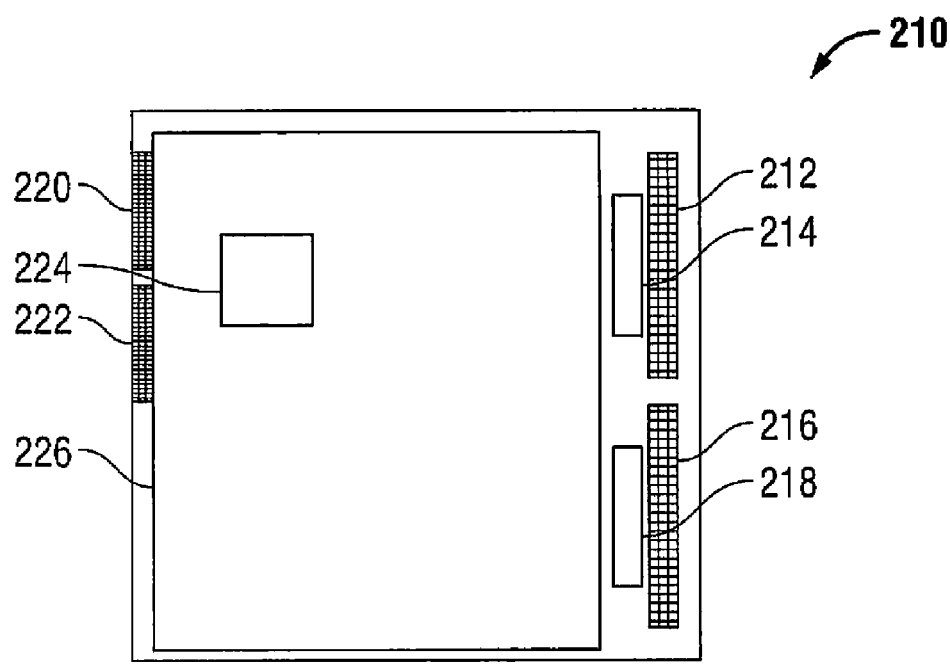
FIG. 16 illustrates an interior elevational view of components of a computer system in a second chamber where the power supply is separated from the motherboard, in accordance with the fourth embodiment of the present disclosure.

FIG. 16 illustrates an interior elevational view of components of a computer system in a second chamber where the power supply is separated from the motherboard, in accordance with the fourth embodiment of the present disclosure. The interior elevation view of the second chamber 210 includes a first front fan 212, a first cable portal 214, a second front fan 216, a second cable portal 218, a first rear fan 220, a second rear fan 222, a CPU 224, and motherboard 226. In FIG. 16, the motherboard/CPU is positioned in a separate chamber than the power supply. In other words, each electronic component may be positioned in a separate chamber, each separate chamber having its own cooling mechanism designed specifically for that electronic component.

Consequently, there are no additional requirements in the embodiments of the present disclosure, other than the minimal standard air cooling devices for the electronics chamber 42. The storage chamber 44 requires its own ventilation cooling devices (fans) to cool off the storage devices. There is no additional space or power requirements, other than what the standard included components require. After continuous observations and comparisons between a present PC case design (fully functional) and a new PC case design according to the present disclosure, the following benefits are credited to the new PC case design.

Benefits of the embodiments of the present disclosure include: minimal standard cooling products are needed to provide efficient cooling air flow within the case, no additional fans are needed, no side fans are needed, no side ventilation is needed, no liquid cooling devices is necessary, no continuous power consumption for unnecessary additional devices is necessary, no higher continuous power consumption for harder working devices such as fans, savings in power consumption are realized, savings in overall original price of the PC case or whole computer are realized by not having to add all the extra cooling devices to provide enough cooling capacity, reduction in overall noise from the fans is realized, no additional ducts are required, reliability and longevity of the electronics is realized because they run cooler, and maximizing the full potential of the CPU power is enabled by running it at constant higher speeds and for longer periods of time.

Concerning noise reduction options, the additional fans and equipment that the manufacturers chose to add, in the conventional art, to the case to reduce some of the heat around the CPU and motherboard, have created additional noise, on top of adding to the cost of producing computers and on top of creating further power consumption. Concerning the cooling options, the additional fans and equipment that the manufacturers chose to add, in the conventional art, to the case have resulted in fans spinning faster, in adding additional fans, in liquid cooling that created more noise, in combining various materials making PCs' heavier, and in adding additional vents. By adding all these items, in the conventional art, in the PC case to cool off, additional PC case requirements have been raised. More powerful power supplies were necessary, the added materials added further to the cost of producing computers, which cost was passed on to the consumers, thus adding to the cost of ownership of a PC.

Consequently, with the PC case design of the present disclosure, there is no hot air flowing over the motherboard. The CPU fan does not re-circulate hot air. All the motherboard components stay cooler by not having any added heat to dissipate. All the fans, in general don't have to spin at maximum or close to maximum speed to circulate or move or exchange the air to cool off the electronic components within the PC case.

While the present disclosure has been particularly shown and described with respect to illustrative and preformed embodiments thereof, it will be understood by those skilled in the art that the foregoing and other changes in form and details may be made therein without departing from the spirit and scope of the present disclosure which should be limited only by the scope of the appended claims.

The invention claimed is:

1. A computer system comprising:
   an enclosure having a plurality of components;
   a first chamber including a set of cooling devices; and
   a second chamber including solely a set of components and a set of cooling devices, the second chamber located adjacent to the first chamber and the set of components including components not included in the first chamber, wherein the set of components includes solely a plurality of storage components selected from the group consisting of a CD-ROM and a hard drive;
   wherein air flow is unidirectional from a front side of the enclosure to a rear side of the enclosure, and wherein air flow is prevented from flowing between the first chamber and the second chamber by a solid separation mechanism there between.

2. The system according to claim 1, wherein the first chamber includes a set of components which includes a plurality of electronic components.

3. The system according to claim 2, wherein the plurality of electronic components includes a power supply and a central processing unit (CPU).

4. The system according to claim 3, wherein the first chamber includes at least two output fans in the rear side and vents in the front side.

5. The system according to claim 1, wherein the first chamber includes a set of components which includes a motherboard.

6. The system according to claim 1, wherein plurality of storage components includes one or more input/output devices.

7. The system according to claim 6, wherein the second chamber includes at least one output fan in the rear side and vents on the front side.

8. The system according to claim 1, wherein a cable portal is located between the first chamber and the second chamber in order to allow one or more cables to pass between the first chamber and the second chamber.

9. The system according to claim 1, wherein a side of the enclosure is a ventilated case door.

10. The system according to claim 1, wherein at least a portion of one side of the enclosure is a ventilated grill.

11. The system according to claim 10, wherein the ventilated grill is positioned only on the first chamber side of the enclosure.

12. The system according to claim 10, wherein the ventilated grill is positioned only on the second chamber side of the enclosure.

13. The system according to claim 1, wherein the first chamber includes a first partial ventilated grill located on a first chamber side and the second chamber includes a second partial ventilated grill located on a second chamber side.

14. The system according to claim 13, wherein the first partial ventilated grill located on the first chamber side is a different size than the second partial ventilated grill located on the second chamber side.

15. The system according to claim 1, wherein at least one side of the enclosure includes a plurality of ventilated grills having one or more different shapes and sizes, the plurality of ventilated grills located on both a first chamber side and a second chamber side.

16. A method for preventing airflow between a first chamber and a second chamber, the chambers located within an enclosure, the method comprising:
   separating a plurality of components within the enclosure having a solid separation mechanism separating the first and second chambers;
   positioning a first set of components and a set of cooling devices in the first chamber; and
   positioning solely a second set of components and another set of cooling devices in the second chamber, the second chamber located adjacent to the first chamber and the first set of components being different than the second set of components, the second set of components includes solely a plurality of storage components selected from the group consisting of a CD-ROM and a hard drive;
   wherein air flow through the two sets of cooling devices is unidirectional from a front side of the enclosure to a rear side of the enclosure.

17. The method according to claim 16, wherein a cable portal is located between the first chamber and the second chamber in order to allow one or more cables to pass between the first chamber and the second chamber, and wherein the first chamber includes a motherboard.

18. The method according to claim 16, wherein at least one side of the enclosure includes a plurality of ventilated grills having one or more different shapes and sizes, the plurality of ventilated grills located on both a first chamber side and a second chamber side.

19. A computer system comprising:
   an enclosure having a plurality of components;
   a first chamber including a first set of cooling devices; and
   a second chamber including solely a set of components and a second set of cooling devices, the second chamber located adjacent to the first chamber, and the set of components includes components not included in the first chamber, wherein the set of components includes solely a plurality of storage components selected from the group consisting of a CD-ROM and a hard drive;
   wherein air flow is unidirectional from a front side of the enclosure to a rear side of the enclosure, and wherein air flow is prevented from flowing between the first chamber and the second chamber by a solid separation mechanism there between, and wherein the first chamber has an air flow path independent of the air flow path of the second chamber.

20. The computer system according to claim 19, wherein a cable portal is located between the first chamber and the second chamber in order to allow one or more cables to pass between the first chamber and the second chamber, and wherein the first chamber includes a motherboard.

* * * * *